United States Patent [19]
Bucks

[11] Patent Number: 5,192,086
[45] Date of Patent: Mar. 9, 1993

[54] DOUBLE RAMP, FULL LENGTH GRIP COLLET

[76] Inventor: James L. Bucks, 7353 Cadle Ave., Mentor, Ohio 44060

[21] Appl. No.: 727,650

[22] Filed: Jul. 9, 1991

[51] Int. Cl.⁵ ............................................ B23B 31/20
[52] U.S. Cl. ...................................... 279/4.09; 279/50; 279/55
[58] Field of Search .......................... 279/4, 121, 65, 60, 279/55, 57, 1 ME, 1 Q, 4.07–4.09, 50; 242/72.1; 254/29 A

[56] References Cited

U.S. PATENT DOCUMENTS

| | | |
|---|---|---|
| 401,962 | 4/1889 | McCanna . |
| 2,407,083 | 9/1946 | Koppel ................................... 279/74 |
| 2,893,291 | 7/1959 | Hollis ....................................... 90/11 |
| 2,954,983 | 10/1960 | Roby ..................................... 279/121 |
| 3,252,710 | 5/1966 | Buck ..................................... 279/121 |
| 4,026,566 | 5/1977 | Röhm ................................... 279/121 |
| 4,198,067 | 4/1980 | Steinberger ..................... 279/123 X |
| 4,366,732 | 1/1983 | Schliep ................................... 81/128 |

FOREIGN PATENT DOCUMENTS

| | | | |
|---|---|---|---|
| 601301 | 1/1960 | Italy .................................... 242/72.1 |
| 300253 | 5/1972 | U.S.S.R. ............................... 279/121 |
| 541284 | 11/1941 | United Kingdom ............... 242/72.1 |

Primary Examiner—Steven C. Bishop
Attorney, Agent, or Firm—Fay, Sharpe, Beall, Fagan, Minnich & McKee

[57] ABSTRACT

A collet for gripping an associated cylindrical workpiece comprises a pair of actuating rings and a plurality of slide blocks. The slide blocks are held within a housing and feature a pair of opposed slots within each slide block. The slots are oriented at a 45° angle to a radial centerline of the slide blocks. Each one of the slots slidably receives one of the actuating rings therein. Axial movement by an actuating ring causes radial movement of the slide block inwardly toward the workpiece to grip it, or outwardly away from the workpiece to release it.

16 Claims, 6 Drawing Sheets

DOUBLE RAMP, FULL LENGTH GRIP COLLET

BACKGROUND OF THE INVENTION

1. Field of the Invention

This invention pertains to the art of collet chucks and more particularly to an improved collet chuck useful in the fabrication of gas risers such as are used in the transmission of natural gas into residential homes.

2. Description of the Related Art

Mechanisms for gripping tubular workpieces by moving segmented gripping surfaces radially inwardly or outwardly are known in the art. Most of these mechanisms grip the workpiece through discrete points of contact about the periphery of the workpiece such as U.S. Pat. No. 4,366,732 to Schliep. Others endeavor to grip the workpiece with more than point contact, such as U.S. Pat. No. 2,407,083 to Koppel. Some have utilized ramps which move the gripping surfaces radially inwardly and outwardly such as U.S. Pat. No. 401,962 to McCanna and U.S. Pat. No. 2,893,292 to Hollis.

While these inventions have been generally useful in their fields, further advantages were desirable, especially in the area of increasing the effective gripping surface area of the collet chuck.

The present invention contemplates a new and improved collet which is simple in design, effective in use, and overcomes the foregoing difficulties and others while providing better and more advantageous overall results.

SUMMARY OF THE INVENTION

In accordance with the present invention, a new and improved collet chuck is provided which is adapted to selectively grip an associated elongated workpiece.

More particularly, in accordance with the invention, the collet chuck comprises a pair of actuating rings and a plurality of slide blocks. Each actuating ring has an inward and an outward surface. Each slide block also has an inward and outward surface, as well as two side surfaces. Each of the blocks have a radial centerline. Each of the blocks also have a pair of opposed slots, each one of which slidably receives one of the actuating rings therein. A centerline of the slots in the slide blocks intersects the radial centerline of one of the slide blocks at an angle whereby movement of one of the actuating rings causes radial movement of the slide block.

According to another aspect of the invention, the slots in the slide blocks make an angle of about 45° with the radial centerline of the slide blocks. Other angles may be used if they are matching angles relative to the radial centerline of the slide blocks.

According to another aspect of the invention, the collet chuck includes an outer housing. The slide blocks are attached to the outer housing by way of pins which are received into holes in the outer housing and the slide blocks.

According to another aspect of the invention, a collet chuck for gripping circular pipe of varying diameters comprises an annular outer housing, a pair of actuating rings, a plurality of slide blocks, a plurality of pins, gripping elements, and movement generation means. The annular outer housing has a plurality of holes drilled therethrough, the holes being equidistantly spaced about the periphery of the outer housing. The pair of actuating rings have extensions attached to and extending therefrom. Each slide block has inward, outward, and side surfaces. The slide blocks are selectively arranged into an annulus. Each of the slide blocks has a pair of opposed slots which slidably receive one of the actuating rings therein. The slots have a centerline which makes an angle with the radial centerline of one of the slide blocks of substantially 45°. Each of the slide blocks has a centerhole therethrough which is aligned with a hole in the outer housing to receive a pin. Gripping elements may be fixedly attached to the interior surface of the slide blocks. The movement generation means comprises selectively moving the actuator ring in a direction parallel to the axial centerline of the collet chuck this movement effective to cause radial movement of the slide blocks.

According to another aspect of the invention, a collet chuck for gripping an associated workpiece comprises a first actuating ring and a segmented gripping means. The first actuating ring has an inward and outward surface. The segments of the gripping means comprises a plurality of slide blocks. Each slide block has a radial centerline and a first slot. The first actuating ring is slidably received within each of the said first slots. Each of the first slots trace a portion of the surface of a cone.

According to another aspect of the invention, the collet chuck further comprises a second actuating ring and second slots in each of the slide blocks. The second actuating ring is slidably received within the second slots. The first actuating ring and the second actuating ring being axially movable in opposite directions in equal amounts so that movement by said slide blocks is only radial.

According to a still further aspect of the invention, the inward surface of each of the slide blocks lie within a plane perpendicular to the axis of the collet chuck and comprise a fraction of a circle. Although nearly any fraction could be used, in the preferred embodiment the inward surface of the slide blocks comprises ⅛ of a circle.

According to a still further aspect of the invention, the inward surfaces of the slide blocks cooperate to press against the exterior surface of an associated Workpiece about its entire circumference.

One advantage of the present invention is that the cylindrical workpiece, commonly a plastic pipe, is gripped over a larger area of its surface than in a conventional collet chuck. Specifically the entire length of the gripping surface of the collet chuck is in contact with and effectively grips the pipe.

Another advantage of the invention is the fact that the slide blocks of the collet chuck travel on ramps to move radially inwardly and outwardly. The ramps are sturdy and easily constructed yet provide repeatable and accurate movement of the blocks.

Another advantage of the invention is the range of workpiece diameters which can be gripped by a single collet chuck. A conventional collet chuck typically has a range of grip of about 1/64 of an inch. The present invention is able to grip a range of associated workpiece diameters approximately equal to a 25% variation of its closed diameter. In other words, the inside diameter between the surfaces of the slide blocks when the collet chuck is open is approximately 25% greater than the same measurement when the collet chuck is closed.

Yet another advantage of the invention is the fact that the slide blocks can be made to move only radially, and not axially, along the pipe.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DESCRIPTION OF THE PREFERRED EMBODIMENT

Figure 1:
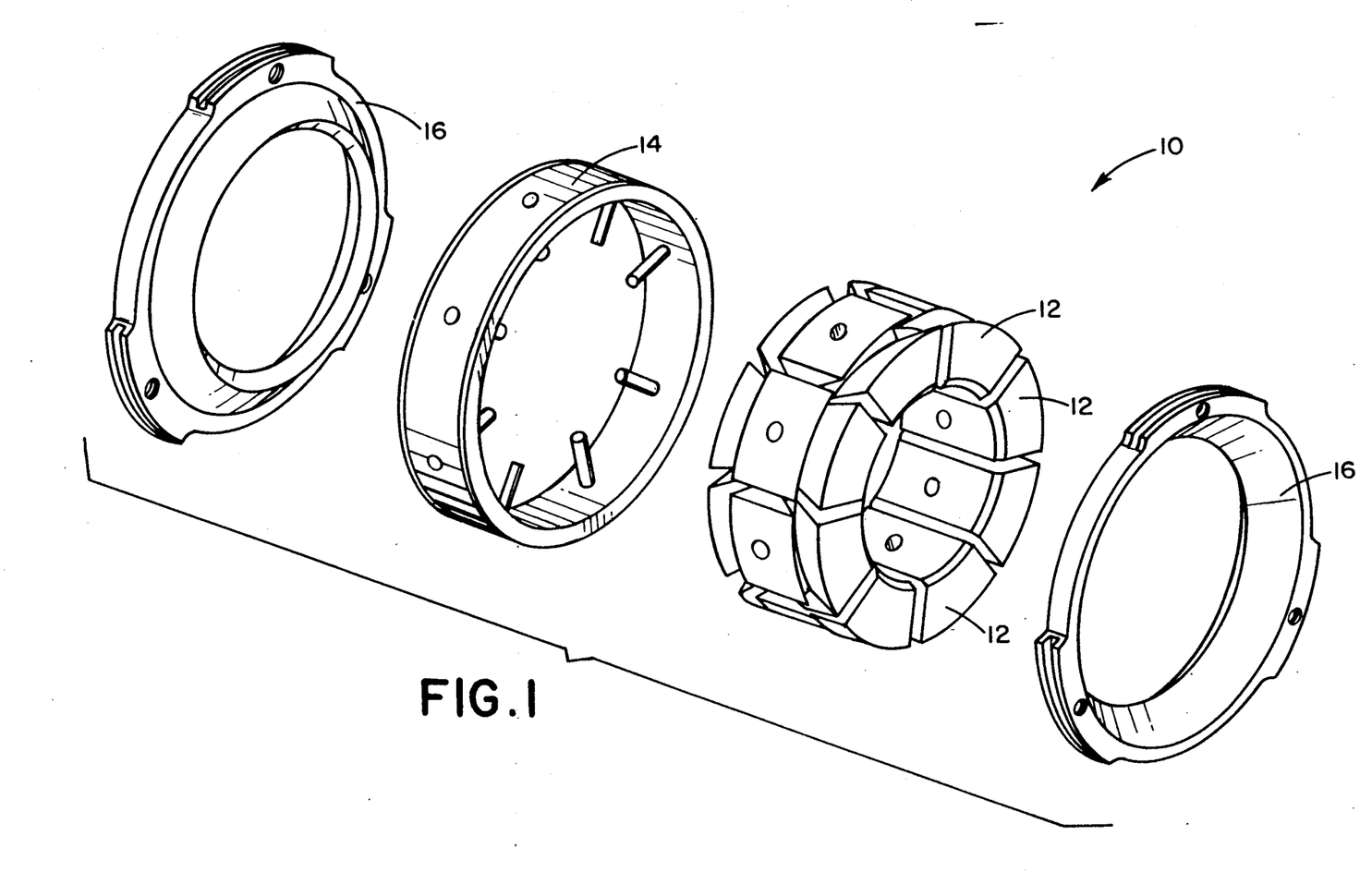
FIG. 1 is a exploded assembly view of a collet chuck according to the present invention.
Figure 2:
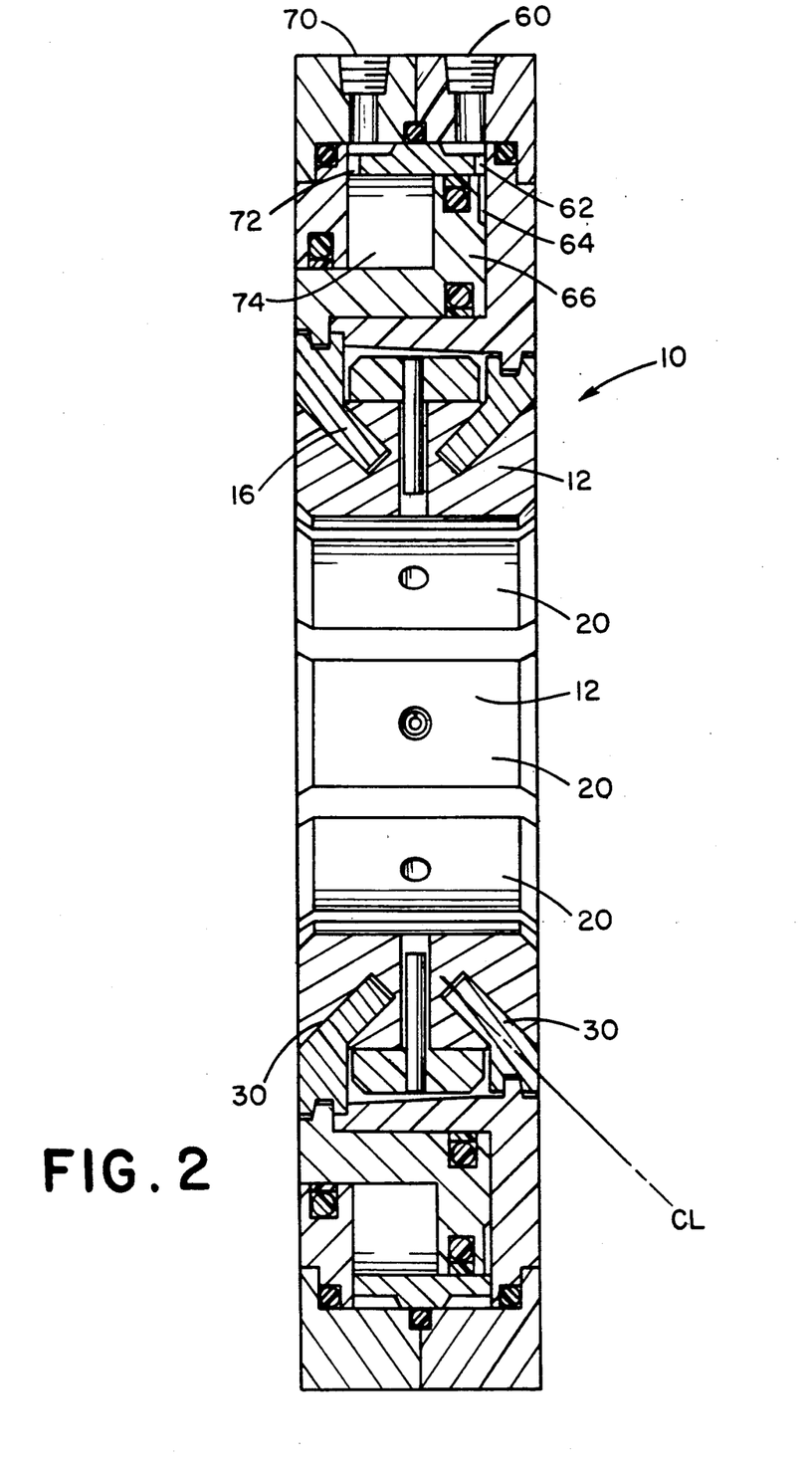
FIG. 2 is a side elevational cross-sectional view of the assembled collet chuck of FIG. 1.
Figures 3A, 3B, 3C:
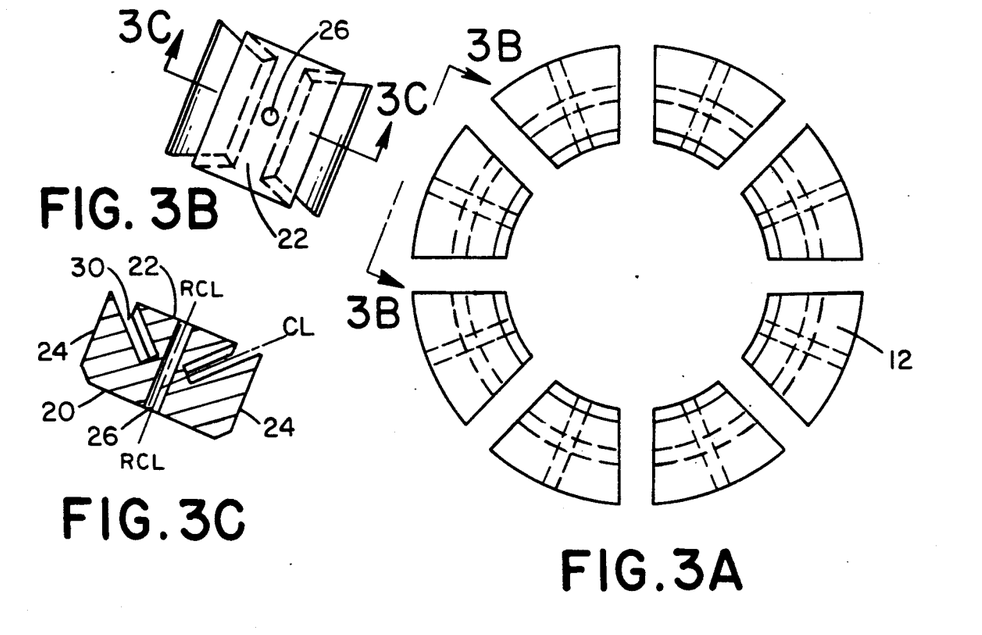
FIG. 3A is a front plan view of slide blocks arranged in an annulus according to the invention.
FIG. 3B is a radial side view of a slide block as indicated by line 3B—3B of FIG. 3A.
FIG. 3C is a cross-sectional view of a slide block taken along line 3C—3C of FIG. 3B.

Referring now to the drawings, wherein the showings are for purposes of illustrating a preferred embodiment of the invention only, and should not be used for purposes of limiting the scope of the claims of the invention, FIG. 1 shows the collet chuck 10 of the invention. Principal elements of the collet chuck 10 are slide blocks 12, a housing 14, and actuating rings 16.

Figure 8:
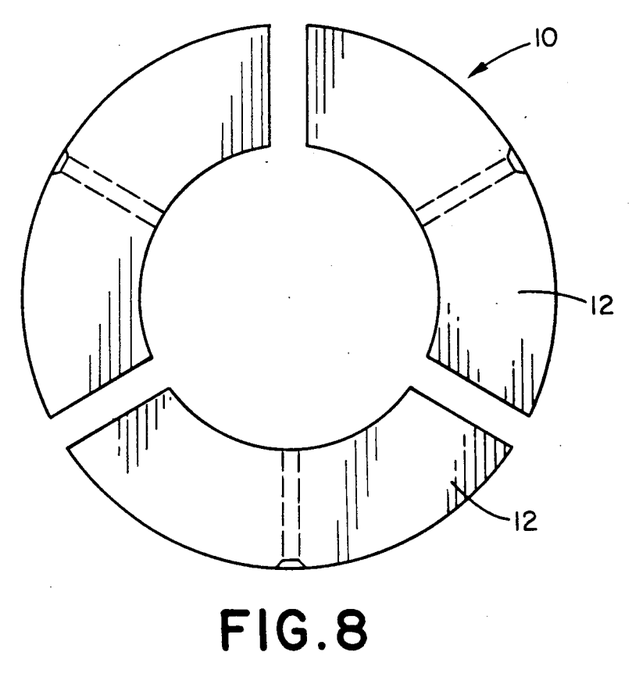
FIG. 8 is a front plan view of a collet chuck according to the invention featuring three slide blocks.
Figure 9:
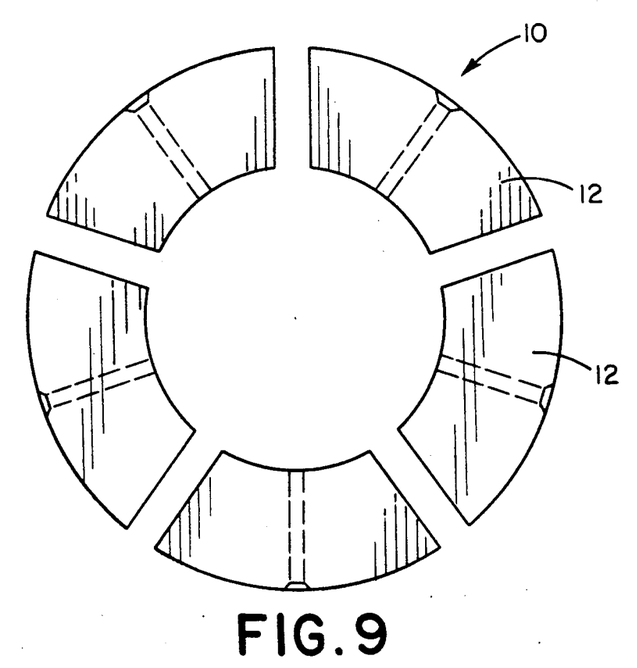
FIG. 9 is a front plan view of a collet chuck according to the invention featuring five slide blocks.
Figure 10:
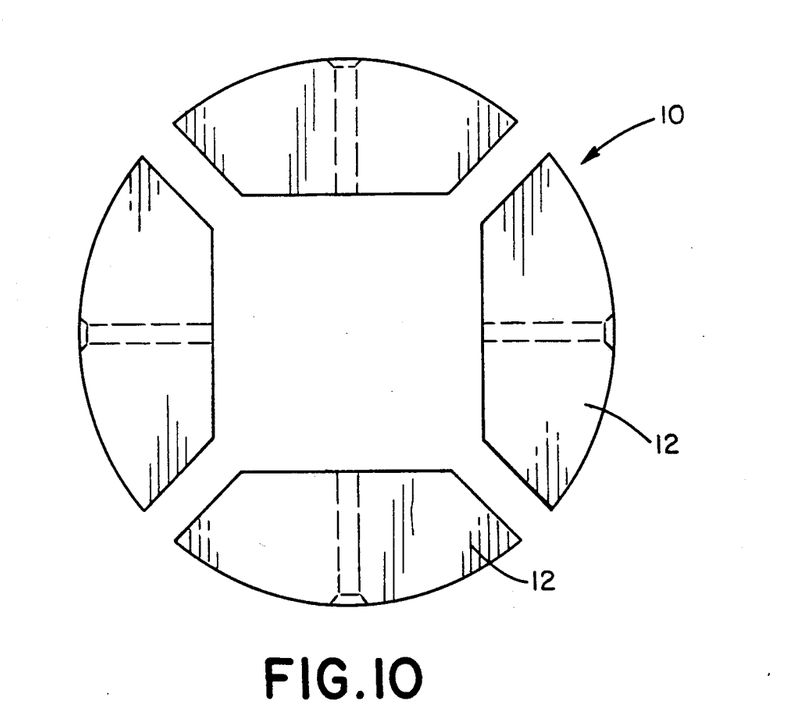
FIG. 10 is a front plan view of a collet chuck according to the invention featuring four slide blocks, the inward surfaces of the slide blocks being fashioned to grip a square associated workpiece; and, FIG. 11 is a front plan view of a collet chuck according to the invention featuring six slide blocks, the inward surfaces of the slide blocks being fashioned to grip a hexagonal associated workpiece.
Figure 11:
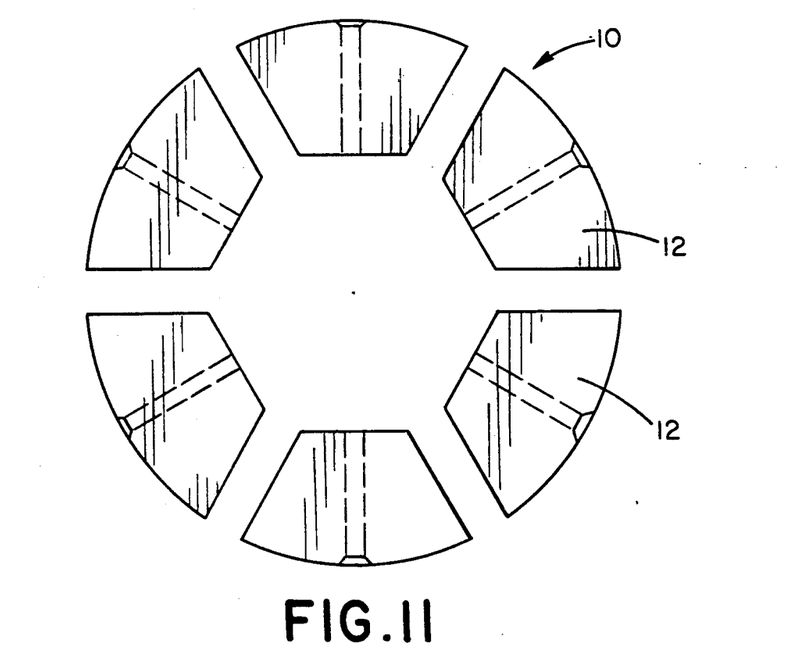

With reference to FIGS. 8 and 9, collets 10 are disclosed with three and five slide blocks 12 respectively. The inward surface of the slide blocks 12 are configured to receive an associated elongated workpiece. With reference to FIGS. 10 and 11, collets 10 are disclosed which feature four and six slide blocks 12 respectively. The inward surfaces 20 of the slide blocks 12 in FIG. 10 are Configured to grip the sides of the workpiece whose cross-section is square. The inward surfaces 20 of the slide blocks 12 in FIG. 11 are configured to grip an associated workpiece whose cross-section is hexagonal. The slide blocks 12 can be designed to grip nearly any shape of workpiece.

With reference to FIGS. 2, 3A, 3B, and 3C, each slide block 12 has an inward surface 2o, an outward surface 22, and side surfaces 24. If desired, a gripping surface can be applied or secured to the inward surface 20. A centerhole 26 is located on the radial centerline RCL of each of the slide blocks 12. Cut into the outward surface 22 of each of the slide blocks 12 is a pair of opposed slots 30. Because the collet chuck 10 is circular, and because the slide blocks 12 feature slots 30 which are cut into the slide block 12 at an angle, the actual configuration of the slot 30 is that of a portion of a cone. Because of this conical shape, the circular actuating rings 16 are able to slide within the slots 30. A centerline cL of each slot 30 makes an angle of 45° with the radial centerline RcL of the slide block 12. Although 45° is the preferred angle, any angle may be used as long as both slots use the same angle. The slots 30 are adapted to slidingly receive actuating rings 16.

Figure 6:
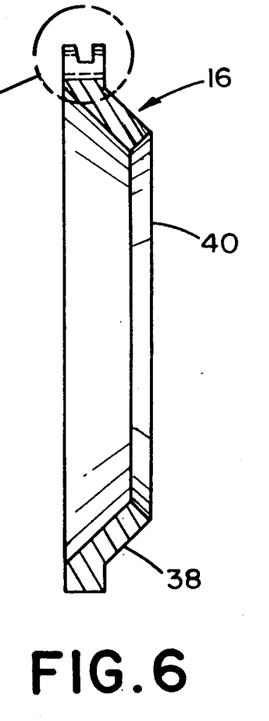
FIG. 6 is a side cross-sectional view taken along line 6—6 of FIG. 7 of an annular ring according to the invention.
Figure 6A:
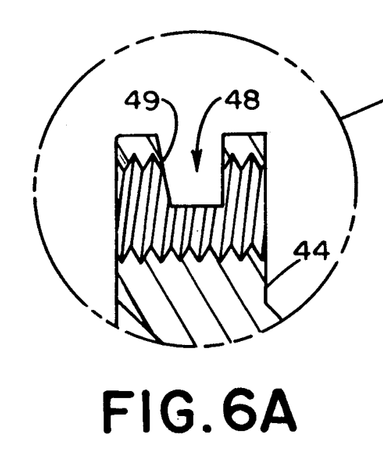
FIG. 6A is an enlarged side cross-sectional view of a portion of the annular ring shown in FIG. 6.
Figure 7:
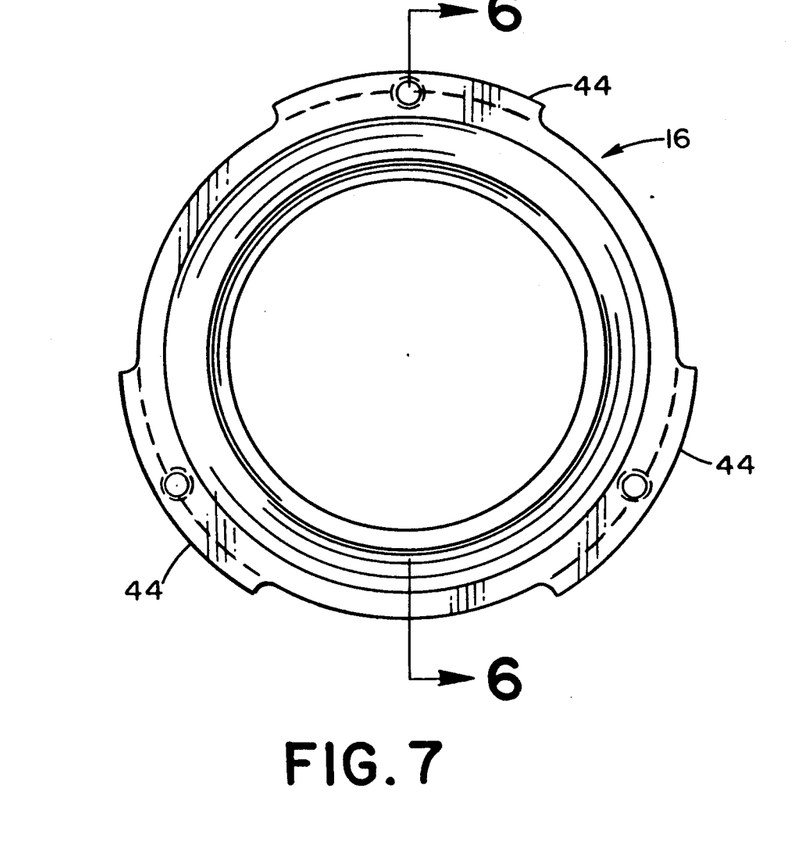
FIG. 7 is a front plan view of an annular ring according to the invention.

With reference to FIGS. 6, 6A, and 7, an actuating ring 16 is shown. Each actuating ring 16 has sliding sections 38 and planar section 40. Planar section 40 primarily lies in a single plane while sliding sections 38 extend from the plane of the planar section 40 at an angle of about 45°. The sliding sections 38 are adapted to be slidingly received within the slots 30 of the slide blocks 12.

A plurality of tabs 44 extend radially outwardly from the sliding sections 38 in a plane parallel to that of the planar section 40. In the preferred embodiment, there are three tabs 44 about the periphery of the sliding sections 38. In the preferred embodiment, each tab 44 has a channel 48 cut into its outermost surface. With reference to FIG. 6A, the axially outermost side 49 of the interior walls of the channel 48 is cut at a 10° taper. This taper adjusts the installation gap back to on-center after each cycle of the machine and allows the movement generation means (discussed below) to center itself in the channel 48 after every movement of the actuating ring 16.

Figure 4:
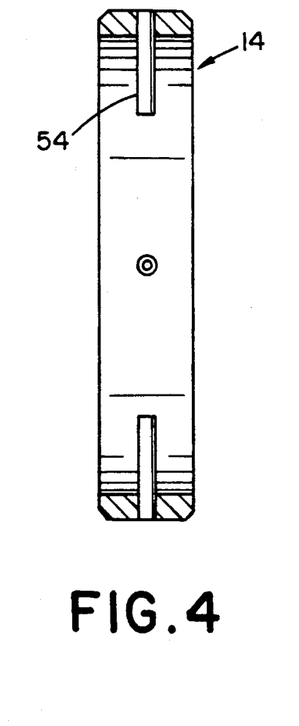
FIG. 4 is a cross-sectional side elevational view taken along line 4—4 of FIG. 5 of a housing according to the invention.
Figure 5:
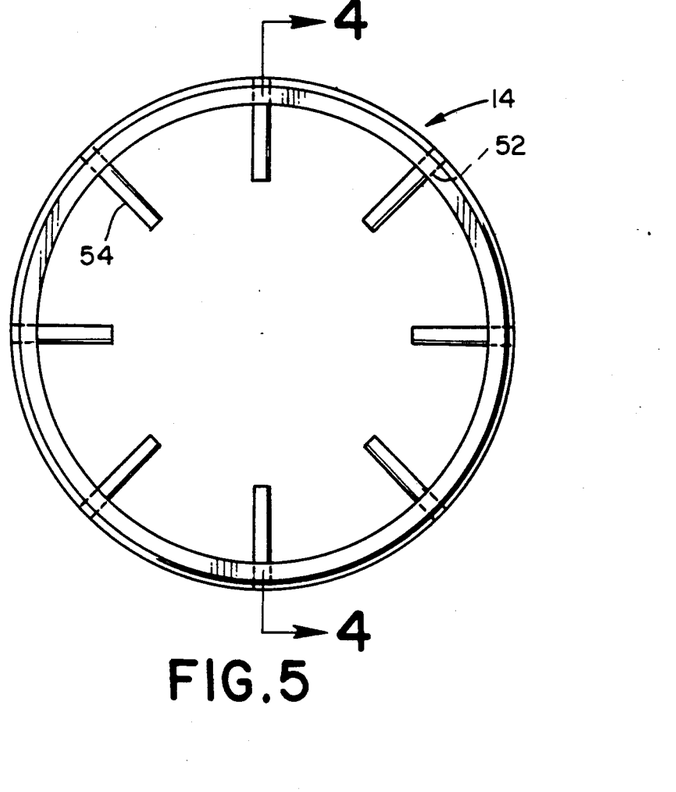
FIG. 5 is a front plan view of an outer housing according to the invention.

Referring to FIGS. 4 and 5, a housing 14 is shown. In the preferred embodiment, the housing 14 features a plurality of equidistantly spaced holes 52. The holes 52 are positioned to cooperate with the centerholes 26 of the slide blocks 12. Suitable pins 54 are used to secure the individual slide blocks 12 to the housing 14. The pins 54 are of sufficient length to allow the slide blocks 12 to move along their radial centerlines RCL.

The function of the collet chuck 10 will now be described. The collet chuck 10 is useful for the gripping of workpieces. The collet chuck 10 has proven especially effective in the manufacture of underground gas risers. With reference to FIGS. 1–7, an associated pipe is inserted within the annulus formed by the slide blocks 12. When the slide blocks 12 are backed radially outwardly away from the axis of the collet chuck 10, there are gaps between their side surfaces 24. A movement generation means is fixedly attached to the tabs 44 of the actuating ring 16. In the preferred embodiment, the movement generation means is an air clutch. For example, with particular reference to FIG. 2, pressurized air is supplied through orifice 60. The air enters passageway 6z and progresses to void 64. This causes piston 66 to move from right to left, moving actuating ring 16 axially outward. To close the collet chuck 10, pressurized air is introduced in orifice 70. The air enters passageway 72 and progresses to void 74. The air pressure moves piston 66 from left to right, causing actuating ring 16 to move axially inwardly, thus moving slide blocks 12 radially inwardly.

Whatever movement generation means is utilized, the movement generation means should be effective to move an actuating ring 16 along the axial axis of the collet chuck 10, such movement causing the distance between the actuating rings 16 to increase. As one actuating ring 16 moves away from the other actuating ring 16, the slide sections 38 of the actuating ring 16 slide within the slots 30 of the slide blocks 12. Because the slots 30 are angled at matching angles, preferably 45°, to the radial centerline RCL, movement by the sliding section 38 of the annular ring 16 in the axial direction within the slot 30 of the slide blocks 12 causes a corresponding movement by the slide blocks 12 in the radial direction. This radial movement continues until the workpiece is gripped by the inward surface 20.

In a currently preferred embodiment, the movement generation means causes each of the actuating rings 16 to move an equal but axially opposite direction. In such case, the slide blocks 12 travel only radially, not axially. In another embodiment, one actuating ring 16 is fixed while the other is moved by the movement generation means. In this case, the slide blocks 12 travel both radially and axially.

If the collet chuck 10 is sized properly for the associated pipe, the entire inward surface 20 of the slide blocks 12 contacts the surface of the associated pipe. This creates a band of gripping surfaces which is as long as the depth of the slide block 12 and which extends about the entire circumference of the associated pipe. In an embodiment utilizing an air clutch as a movement generation means, the gripping force is modulated by the air pressure applied to the air clutch. This increased gripping surface area contributes to improved performance in that the pipe does not turn or move during the manufacturing operation, nor is crushed or damaged by one area of the pipe surface being stressed more heavily than another.

In another embodiment, a boss (not shown) is fixedly attached to the inward surface 20 of each slide block. The bosses extend outwardly from the slide blocks and can be used to grip the inside diameter of an associated workpiece. This arrangement can often be useful where the inside diameter is to be held to a certain tolerance or where the outside diameter is undesirable for gripping.

The invention has been described with reference to a preferred embodiment. Obviously, modifications and alterations will occur to those skilled in the art upon a reading and understanding of this specification. It is intended to include all such modifications and alterations insofar as they come within the scope of the appended claims or equivalents thereof.

Having thus described the invention, it is now claimed:

1. A collet chuck for gripping an associated workpiece, said collet chuck comprising:
    first and second actuating rings, each actuating ring having an inward and an outward surface and a sliding section, said sliding section having a configuration of a portion of the surface of a cone; and,
    a plurality of slide blocks, each slide block having an inward surface and an outward surface and two side surfaces, each of said blocks having a radial centerline, each of said blocks having a pair of opposed slots, said slots having a configuration of a portion of the surface of a cone, each of one of said slots slidably receiving one of said sliding sections of said actuating rings therein, a centerline of each of said slots of one of said slid blocks intersecting the radial centerline of one of said slide blocks at an angle whereby movement by one of said actuating rings causes radial movement of said slide block.

2. The collect chuck of claim 1 wherein said centerline of one of said slots intersects said radial centerline of said one of said slide blocks at substantially a 45° angle.

3. The collet chuck of claim 1 wherein the entire area of said inward surface of each of said slide blocks comprises a portion of a surface of a cylinder.

4. The collect chuck of claim 1 further comprising:
    an outer housing, said slide blocks attached thereto.

5. The collet chuck of claim 4 further comprising:
    pins, said pins received into holes in said outer housing and into centerholes in said slide blocks, said slide blocks selectively slidable on said pins, said pins attaching said slide blocks to said housing.

6. The collet chuck of claim 1 further comprising:
    movement generation means for generating movement of said actuating rings in a direction parallel to an axial centerline of said collet chuck.

7. The collet chuck of claim 1 wherein said first actuating ring is selectively moveable in a direction parallel to the axial centerline of said collet chuck and away from said second actuating ring,s aid second actuating ring selectively moveable in a direction parallel to said axial centerline of said collet and away from said first actuating ring.

8. The collet chuck of claim 7 wherein said first and second actuating rings are selectively moveable in equal and opposite axial directions so that the movement of said slide blocks is only radial.

9. The collet chuck of claim 3 wherein a portion of said inward surface of each of said slide blocks lying within a plane perpendicular to said axis of said collet chuck comprises one third of a circle.

10. The collet chuck of claim 3 wherein a portion of said inward surface of each of said slide blocks lying within a plane perpendicular to said axis of said collet chuck comprises one eighth of a circle.

11. The collet chuck of claim 3 wherein a portion of said inward surface of each of said slide blocks lying within a plane perpendicular to said axis of said collet chuck comprises one side of a square.

12. The collet chuck of claim 3 wherein a portion of said inward surface of each of said slide blocks lying within a plane perpendicular to said axis of said collet chuck comprises one side of a pentagon.

13. The collet chuck of claim 3 wherein said inward surfaces of said slide blocks cooperate to form a cylindrically-shaped inner cavity when said slide blocks are moved radially inwardly.

14. A mechanism for tightly gripping an associated working piece along a length of the workpiece, said mechanism comprising:
    an annular outing housing;
    a slide block, said slide block having inward, outward, and side surfaces, said side surfaces, said slide block having a pair of opposed slots in said outward surface and extending toward said inward surface, said slots having a configuration of a portion of the surface of a cone;
    first and second actuating rings, each of said actuating rings having a first edge and a second edge and a sliding section, said sliding section having a configuration of a portion of the surface of a cone, said first edge of said actuating rings being slidingly received within one of said slots; and, movement generation means for generating movement, said second edge of said first actuating ring being fixedly attached to said movement generation means, said movement generation means selectively moving said first actuating ring relative to said second actuating ring along a line parallel to the axial centerline of said collet chuck, said movement of said first actuating ring causing radial movement of said slide block as said sliding sections of said actuating rings slide within said slots.

15. A collet chuck for gripping circular pipe of varying diameters, said collet chuck comprising:

an annular outer housing having a plurality of holes drilled therethrough, said holes being equidistantly spaced about the periphery of said outer housing;

a pair of actuating rings, said rings having an extension therefrom;

a plurality of slide blocks, each slide block having inward, outward, and two side surfaces, said slide blocks selectively arranged into an annulus, each of said slide blocks having a pair of opposed slots, each one of said slots slidably receiving one of said actuating rings therein, a centerline of each of said slots of one of said slide blocks intersecting a radial centerline of said one of said slide blocks at substantially 45', each of said slide blocks having a centerhole therethrough, each of said centerholes aligned with one of said holes in said outer housing;

a plurality of pins, one of said pins received within each of said centerholes and each of said holes in said outer housing, said pins fixedly attaching said slide blocks to said outer housing;

gripping elements, one of said gripping elements fixedly attached to said interior surface of each of said slide blocks; and, movement generation means for generating movement of said actuating rings, said movement generation means selectively moving said actuating ring in a direction parallel to an axial centerline of said collet chuck, said movement of said actuating ring causing radial movement of said slide blocks.

16. A collet chuck for gripping an associated workpiece, said collet chuck comprising:

first and second actuating rings, said first and second actuating rings having inward and outward surfaces;

a segmented gripping means for gripping the associated workpiece, said gripping means having segments, said segments of said gripping means comprising a plurality of slide blocks, each slide block having a radial centerline and first and second slots, said first actuating ring slidably received within said first slot, said first and second slots tracing a portion of the surface of a cone, said second actuating ring slidably received within said second slot, said first and second actuating rings being axially movable equal amounts in opposite directions so that movement by said slide blocks is only radial.

* * * * *